United States Patent [19]

Shiono et al.

[11] Patent Number: 5,870,275
[45] Date of Patent: Feb. 9, 1999

[54] ELECTROLYTE AND ELECTRONIC COMPONENT USING SAME

[75] Inventors: Katsuji Shiono, Ohtsu; Yukihiro Nitta, Kyoto, both of Japan

[73] Assignees: Sanyo Chemical Industries, Ltd., Kyoto; Matsushita Electric Industrial Co., Ltd., Osaka, both of Japan

[21] Appl. No.: 796,992

[22] Filed: Feb. 7, 1997

Related U.S. Application Data

[63] Continuation of Ser. No. 495,622, Aug. 25, 1995, abandoned.

[51] Int. Cl.$^6$ .................. H01G 9/02; H01G 9/00
[52] U.S. Cl. .................. 361/504; 361/503; 361/527; 252/62.2
[58] Field of Search .................. 361/500, 503, 361/504, 525, 505, 512, 527; 540/470, 553, 242, 335, 347.1; 252/62.2; 562/553, 589

[56] References Cited

U.S. PATENT DOCUMENTS

| | | | |
|---|---|---|---|
| 4,473,864 | 9/1984 | Van Heusden | 361/327 |
| 4,652,968 | 3/1987 | Shimamoto et al. | 361/319 |
| 4,715,976 | 12/1987 | Mori et al. | 252/62.2 |
| 4,892,944 | 1/1990 | Mori et al. | 544/107 |

OTHER PUBLICATIONS

Streitwieser, Introduction to Organic Chemistry, Amines, Chapter 27, 1992, pp. 765–772.

E.I. Cooper et al, "New, Stable, Ambient–Temperature Molten Salts", *Proceedings of the Eighth International Symposium on Molten Salts*, pp. 386–394 (1992).

Mizuno et al., Sulfur–Assisted O–Carbonylation of Alcohols with Carbon Monoxide in the Presence of DBU, Tetrahedron Letters, 1988, vol. 29, No. 37, pp. 4767–4756.

Herrington et al., Flexible Polyurethane Foams, Dow Plastics, 1991, Appendix D Catalysts, pp. D12 and D13.

Jungermann, Cationic Surfactants, Marcel Dekker, Inc., New York, 1970, pp. 9–11.

Katritzky et al., Advanced in Heterocyclic Chemistry, Academic Press, New York and London, 1964, vol. 3. The Quaternization of Heterocyclic Compounds, pp. 1–3.

*Primary Examiner*—Kristine Kincaid
*Assistant Examiner*—Anthony Dinkins
*Attorney, Agent, or Firm*—Pollock, Vande Sande & Amernick

[57] ABSTRACT

The present invention relates to an electrolyte for use in electronic components and electrolytic capacitors in which said electrolyte is used; including as a solute, a quaternary salt of a compound having a N,N,N'-substituted amidine group, such as 1-methylimidazole, 1-methylbenzoimidazole, 1,2-dimethylimidazoline, 1,2-dimethyl-1,4,5,6-tetrahydropyrimidin e, 1,8-diazabicyclo [5.4.0]undecene-7,1,5-diazabicyclo [4.3.0]nonene-5 and the like. The electronic components such as electrolytic capacitors and electrochromic display devices, using this electrolyte, have an excellent thermostability, high specific conductivity, and do not degrade or corrode metal, resin or rubber.

17 Claims, 1 Drawing Sheet

ELECTROLYTE AND ELECTRONIC COMPONENT USING SAME

This application is a continuation of U.S. patent application Ser. No. 08/495,622, filed Aug. 25, 1995 abandoned.

TECHNICAL FIELD

The present invention relates to an electrolyte for use in electronic components such as aluminum electrolytic capacitors, electric double layer capacitors and electrochromic display devices, characterized in that it comprises, as a solute, a quaternary salt of a compound having a specific amidine group, and to electronic components in which said electrolyte is used.

BACKGROUND ART

The electrolytes so far known for use in the electronic components mentioned above include, among others, electrolytes for aluminum electrolytic capacitors such as those containing, as a solute, a quaternary ammonium salt of an aromatic carboxylic acid (e.g. phthalic acid) (U.S. Pat. No. 4,715,976), those containing, as a solute, a quaternary ammonium salt of maleic acid (U.S. Pat. No. 4,715,976) and those containing, as a solute, a quaternary ammonium salt of an aliphatic saturated dicarboxylic acid (U.S. Pat. No. 4,473,864).

Also known as electrolytes for electric double layer capacitors are those containing, as a solute, a quaternary ammonium salt of perchloric acid (Japanese Kokoku Publication Sho-54-9704), among others.

With the miniaturization, weight saving and high-density packaging of electronic devices and equipments in recent years, the production of electronic components in the form of chips has been increased. However, in this field of utilization, the electrolytes mentioned above are poor in thermal resistance and, to cope with the demand for chips, contrivances have been made only with respect to the sheathing material for intercepting heat from the outside or with respect to the method of sealing. In view of the expected further increase of chip-form production and the planar packaging of large electronic components in the future, the soldering temperature is expected to become higher, hence an electrolyte having thermal resistance at the reflow soldering temperature is earnestly desired.

Another problem is that when aluminum electrolytic capacitors or electric double layer capacitors are constructed using the above-mentioned electrolytes and a rubber sealant, the excess hydroxide ion formed by electrolysis of the quaternary salts on the negative potential electrode side causes degradation of the rubber sealing member, leading to marked deterioration of the sealing performance.

Accordingly, it is an object of the present invention to provide an electrolyte capable of meeting such requirements, namely an electrolyte having higher thermal resistance, high specific conductivity, excellent durability, free of the risk of causing sealing member deterioration, as well as providing an electronic component in which such electrolyte is used.

DISCLOSURE OF THE INVENTION

The present invention provides an electrolyte defined below under [1], an electronic component defined below under [2] and an aluminum electrolytic capacitor defined below under [3].

[1] An electrolyte which comprises a solution of a quaternary salt (A) of a compound (a) of the general formula (1) shown below which has an N,N,N'-substituted amidine group.

In formula (1), $R^1$ is a $C_1$–$C_{20}$ hydrocarbon group, which may optionally be substituted by a hydroxyl group, or a hydrogen atom; and $R^2$, $R^3$ and $R^4$ each independently is a $C_1$–$C_{10}$ hydrocarbon group, which may optionally have a hydroxyl, amino, nitro, cyano, carboxyl, ether or aldehyde group. Two to all of $R^1$, $R^2$, $R^3$ and $R^4$ may be mutually united to form a ring or rings.

[2] An electronic component in which the above-defined electrolyte [1] is used.

[3] An aluminum electrolytic capacitor, containing therein an electrolyte comprising an organic solvent solution of a salt composed of a cation having a structure resulting from a $C_1$–$C_{11}$ alkyl or arylalkyl group, which may optionally contain a hydroxyl group, attaching to one of the two nitrogen atoms of a cyclic amidine compound of the formula (2) shown below and a carboxylic acid anion.

In formula (2), $R^5$ is a $C_1$–$C_{20}$ hydrocarbon group, which may optionally be substituted by a hydroxyl group, or a hydrogen atom; $R^6$ is a $C_1$–$C_{10}$ hydrocarbon group, which may optionally be substituted by a hydroxyl group; and Q is a $C_2$–$C_{10}$ alkylene, arylene or alkenylene group, which may optionally be substituted by a $C_1$–$C_5$ hydrocarbon group or by an amino, nitro, cyano, carboxyl or aldehyde group.

The electrolyte of the present invention has high thermal stability and high specific conductivity since it contains, as a solute, said quaternary salt (A) having the amidine group

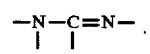

In addition to the cationic group form (form 1̂ shown below) resulting from quaternization of the amidine group, said quaternary salt (A) may also take, in many instances, the structure resulting from resonance stabilization of the cation due to electron delocalization in the amidine group (form 2̂ shown below). Either form of them is defined herein as "quaternary salt". In particular, when a compound having the latter resonance-stabilized structure is used as the solute, a higher specific conductivity is presumably obtained by the promotion of ionic dissociation.

On the other hand, even when the hydroxide ion is formed in excess as a result of the electrolysis reaction in tile electrolyte, the hydroxide ion disappears rapidly owing to its reaction with the amidine group. Therefore, unlike the prior art amine-derived quaternary ammonium salts, the quaternary salt(A) can supposedly lessen the above-mentioned effects of the electrolysis reaction and, as a result, improve the sealing performance of the capacitor.

BEST MODES FOR CARRYING OUT THE INVENTION

Figure 1:
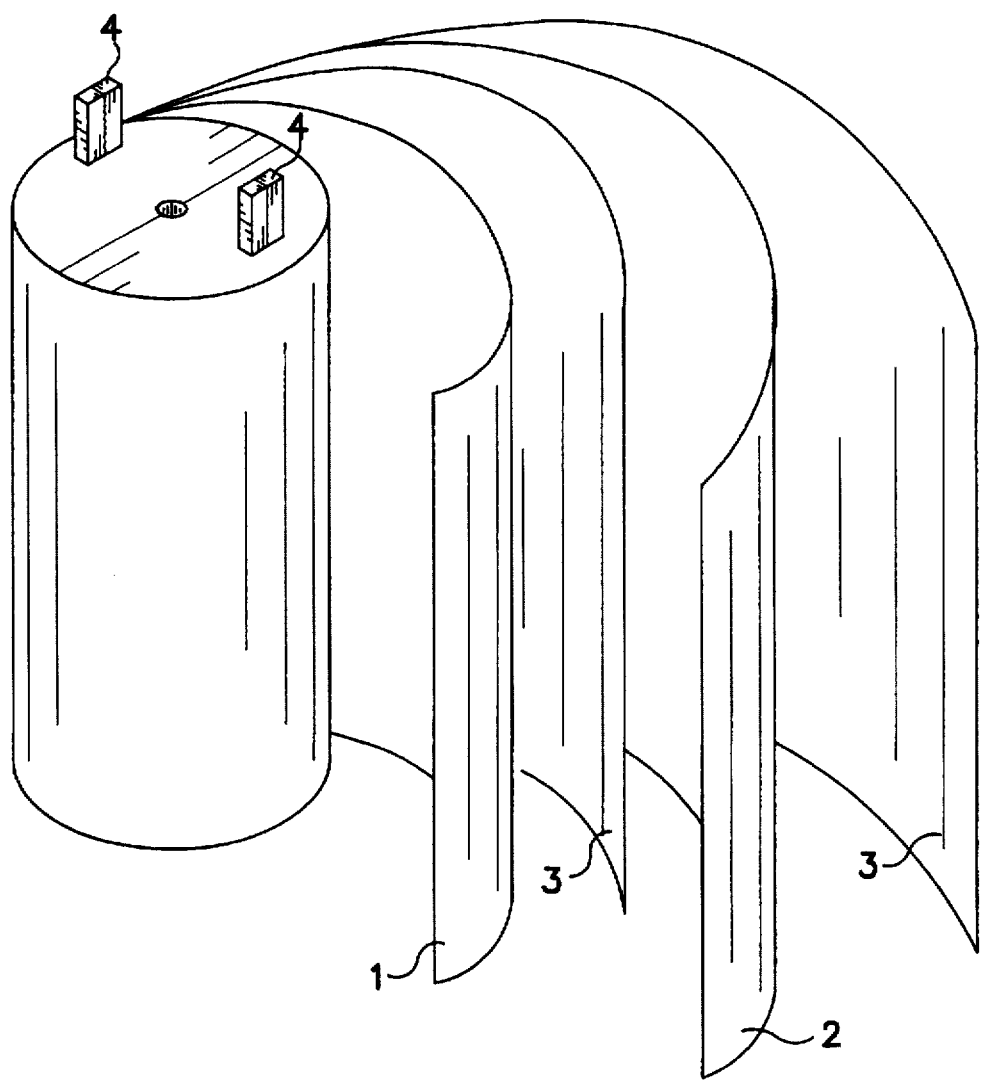
FIG. 1 is a schematic perspective view illustrating the element part of an aluminum electrolytic capacitor suited for the application thereto of the electrolyte of the present invention. 1 shows anode foil, 2 shows cathode foil, 3 shows separator and 4 shows drawn lead.

For illustrating the present invention in more detail, preferred embodiments of the present invention are described in the following.

Referring to general formula (1), $R^1$ is a $C_1$–$C_{20}$ hydrocarbon group, which may optionally be substituted by a hydroxyl group, or a hydrogen atom. Preferred as $R^1$ is a $C_1$–$C_7$ hydrocarbon group, which may optionally be substituted by a hydroxyl group, or a hydrogen atom.

$R^2$, $R^3$ and $R^4$ each independently is a $C_1$–$C_{10}$, preferably $C_1$–$C_7$, hydrocarbon group, which may optionally be substituted by a hydroxyl, amino, nitro, cyano, carboxyl, ether or aldehyde group.

Two to all of $R^1$, $R^2$ $R^3$ and $R^4$ may be mutually united to form a ring or rings. Thus, for instance, $R^1$ may be bound to $R^2$, and $R^3$ to $R^4$.

The compound (a) of general formula (1), which has an N,N,N'-substituted amidine group, may be acyclic or cyclic.

As particular examples of compound (a) in acyclic form, there may be mentioned N,N-dimethyl-N'-benzylformamidine, N-methyl-N,N'-dibenzylformamidine, N,N-dimethyl-N'-benzylacetamidine, N,N-dimethyl-N'-phenylacetamidine, N-methyl-N,N'-dibenzylacetamidine, and the like.

When in cyclic form, the compound (a) is, for instance, a cyclic amidine compound of the above general formula (2).

In general formula (2), $R^5$ is a $C_1$–$C_{20}$ hydrocarbon group, which may optionally be substituted by a hydroxyl group, or a hydrogen atom. Preferred as $R^5$ are $C_1$–$C_7$ hydrocarbon groups, which may optionally be substituted by a hydroxyl group, and a hydrogen atom.

$R^6$ is a $C_1$–$C_{10}$, preferably $C_1$–$C_7$, hydrocarbon group, which may optionally be substituted by a hydroxyl group.

Q is a $C_2$–$C_{10}$ alkylene, arylene or alkenylene group, which may optionally be substituted by a $C_1$–$C_5$ hydrocarbon group or by an amino, nitro, cyano, carboxyl or aldehyde group. Preferred examples of Q are ethylene, n- or isopropylene, phenylene and vinylene group.

As the cyclic amidine compound represented by the above general formula (2), there may be mentioned, for example, compounds having an imidazole, 2-imidazoline or a tetrahydropyrimidine ring. Specific examples are as follows:

① Monocyclic imidazole compounds:

Imidazole homologs: 1-Methylimidazole, 1-phenylimidazole, 1-benzylimidazole, 1,2-dimethylimidazole, 1-ethyl-2-methylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole and the like;

Hydroxyalkyl derivatives: 1-methyl-2-hydroxymethyl imidazole, 1-methyl-2-hydroxyethylimidazole, 1-methyl-4-hydroxymethylimidazole, 1-(β-hydroxyethyl)imidazole, 1-methyl-2-ethoxymethylimidazole, 1-ethoxymethyl-2-methylimidazole and the like;

Nitro and amino derivatives: 1-methyl-4(5)-nitroimidazole, 1,2-dimethyl-4(5)-nitroimidazole, 1,2-dimethyl-5(4)-aminoimidazole, 1-methyl-4(5)-(2-aminoethyl)imidazole, 1-(β-aminoethyl)imidazole and the like;

② Benzimidazole compounds: 1-Methylbenzimidazole, 1-methyl-2-benzylbenzimidazole, 1-methyl-5(6)-nitrobenzimidazole and the like;

③ Compounds having a 2-imidazoline ring: 1-Methylimidazoline, 1,2-dimethylimidazoline, 1,2,4-trimethylimidazoline, 1,4-dimethyl-2-ethylimidazoline, 1-methyl-2-phenylimidazoline, 1-methyl-2-benzylimidazoline, 1-methyl-2-hydroxyethylimidazoline, 1-methyl-2-heptylimidazoline, 1-methyl-2-undecylimidazoline, 1-methyl-2-heptadecylimidazoline, 1-(β-hydroxyethyl)-2-methylimidazoline, 1-methyl-2-ethoxymethylimidazoline, 1-ethoxymethyl-2-methylimidazoline and the like;

④ Compounds having a tetrahydropyrimidine ring: 1-Methyl-1,4,5,6-tetrahydropyrimidine, 1,2-dimethyl-1,4,5,6-tetrahydropyrimidine, 1,8-diazabicyclo[5.4.0]undecene-7,1,5-diazabicyclo[4.3.0]nonene-5, the compounds described in Japanese Kokoku Publication Sho-46-37503, and the like.

Preferred among the compounds listed above as examples of compound (a) are those cyclic amidine compounds represented by general formula (2). More preferred are those compounds which have an imidazole, 2-imidazoline or a tetrahydropyrimidine ring, in particular 1-methylimidazole, 1,2-dimethylimidazole, 1,4-dimethyl-2-ethylimidazole, 1-methylbenzimidazole, 1,2-dimethylimidazoline, 1,2,4-trimethylimidazoline, 1,4-dimethyl-2-ethylimidazoline, 1-methyl-2-heptylimidazoline, 1,2-dimethyl-1,4,5,6-tetrahydropyrimidine, 1,8-diazabicyclo[5.4.0] undecene-7 and 1,5-diazabicyclo[4.3.0]nonene-5.

Said quaternary salt (A) is generally composed of a cation derived by quaternization from one of the compounds mentioned above as examples of (a) and an acid anion.

As regards the method of quaternization of (a), the quaternization can be carried out using an alkylhalide, which is a quaternizing agent, as described in J. Am. Chem. Soc., 69, 2269 (1947). As other quaternizing agents for (a), there may be mentioned dialkyl sulfates, sulfonic acid esters (U.S.S.R. SU 176290), dimethyl carbonate (U.S. Pat. No. 2,635,100), phosphoric acid esters (Journal f. prakt. Chemie. Band 317, Heft 5, 1975, 733), epoxy group-containing compounds (U.S. Pat. No. 2,127,476) and so forth. When it is necessary to exchange the anion portion for the anion constituent of said quaternary salt (A), for example when quaternization of (a) with an alkylhalide is to be followed by anion exchange for an organic acid anion, the quaternary salt having the desired organic acid anion can be obtained, for example by exchanging the halogen ion resulting from quaternization once for the hydroxide ion and then reacting the hydroxide with the corresponding organic acid.

Preferred as said quaternary salt (A) is one obtained by reacting (a) with a quaternizing agent having a $C_1$–$C_{11}$ alkyl or arylalkyl group which may optionally contain a hydroxyl group, if necessary followed by anion exchange for a preferred acid anion. This is a salt composed of a cation having a structure resulting from binding of the $C_1$–$C_{11}$ alkyl or arylalkyl group to one of the nitrogen atoms of (a) and the acid anion.

The anion-constituting acid for the quaternary salt (A) may be an organic acid selected, for example, from among those mentioned below under ① to ④ or an inorganic acid selected, for example, from among those listed below under ⑤.

① Carboxylic acids

Polycarboxylic acids (dibasic to tetrabasic carboxylic acids): aliphatic polycarboxylic acids [saturated polycarboxylic acids (e.g. oxalic acid, malonic acid, succinic acid, glutaric acid, adipic acid, pimelic acid, suberic acid, azelaic acid, sebacic acid); unsaturated polycarboxylic acids (e.g. maleic acid, fumaric acid, itaconic acid)]; aromatic polycarboxylic acids [e.g. phthalic acid, isophthalic acid, terephthalic acid, trimellitic acid, pyromellitic acid]; S-containing polycarboxylic acids [e.g. thiodipropionic acid] and the like;

Hydroxy carboxylic acids: aliphatic hydroxy carboxylic acids [e.g. glycolic acid, lactic acid, tartaric acid]; aromatic hydroxy carboxylic acids [e.g. salicylic acid, mandelic acid] and the like;

Monocarboxylic acids: $C_1-C_{30}$ aliphatic monocarboxylic acids [saturated monocarboxylic acids (e.g. formic acid, acetic acid, propionic acid, butyric acid, isobutyric acid, valeric acid, capronic acid, enanthic acid, caprylic acid, pelargonic acid, lauric acid, myristic acid, stearic acid, behenic acid); unsaturated mono carboxylic acids (e.g. acrylic acid, methacrylic acid, oleic acid)]; aromatic monocarboxylic acids [e.g. benzoic acid, cinnamic acid, naphthoic acid] and the like;

② Phenols

Monohydric phenols (inclusive of phenols and naphthols):

phenol; alkylphenols (e.g. cresol, xylenol, ethylphenol, n- and isopropylphenol, n- and isoamylphenol, isononylphenol, isododecyl phenol); methoxyphenols (e.g. eugenol, guaiacol); naphthol, cyclohexylphenol, and the like;

Polyhydric phenols: catechol, resorcinol, pyrogallol, phloroglucinol, and the like;

③ Mono- and dialkyl phosphate esters Mono- and dimethyl phosphate, mono- and diisopropyl phosphate, mono- and dibutyl phosphate, mono- and di-(2-ethylhexyl) phosphate, mono- and diisodecyl phosphate and the like;

④ Sulfonic acids p-Toluenesulfonic acid, dodecylbenzenesulfonic acid, sulfo-salicylic acid, and the like;

⑤ Inorganic acids

Phosphoric acid, tetrafluoroboric acid, perchloric acid, hexafluorophosphoric acid, hexafluoroantimonic acid, hexafluoroarsenic acid, trifluoromethane sulfonic acid and the like.

When the electrolyte is intended for use in aluminum electrolytic capacitors, the carboxylic acids and mono- and dialkyl phosphates are preferred among them, and phthalic acid and maleic acid are more preferred.

In the case of electric double layer capacitors, the inorganic acids are preferred among them, and tetrafluoroboric acid, perchloric acid, hexafluoro phosphoric acid and trifluoromethane sulfonic acid are more preferred.

The molecular weight of the acid is generally 46 to 500, preferably 90 to 300. A molecular weight exceeding 500 results in decreased solubility in the solvent of the electrolyte.

The pH of the electrolyte of the present invention is generally 4 to 11 and preferably 6 to 9. Said quaternary salt (A) should recommendably be produced under such conditions of the kind and quantity of anion and the like) that the pH of the electrolyte may fall within this pH range. For example, when a partial ester of a polybasic acid, such as a polycarboxylic acid, is used as the anion-forming component, care should be given to pH adjustment. The pH of the electrolyte is the pH value of the electrolyte without dilution as found upon analysis at 25° C.

The electrolyte of the present invention comprises a solution of said quaternary salt (A). Generally, an organic solvent and/or water can be used as the solvent. Typical examples of the organic solvent are given below. Two or more of them may be used in combination.

Alcohols:

Monohydric alcohols (e.g. methyl alcohol, ethyl alcohol, propyl alcohol, butyl alcohol, diacetone alcohol, benzyl alcohol, amyl alcohol, furufuryl alcohol); dihydric alcohols (e.g. ethylene glycol, propylene glycol, diethylene glycol, hexylene glycol); trihydric alcohols (e.g. glycerol); hexitol and the like;

Ethers:

Monoethers (e.g. ethylene glycol monomethyl ether, ethylene glycol monoethyl ether, diethylene glycol monomethyl ether, diethylene glycol monoethyl ether, ethylene glycol phenyl ether, tetrahydrofuran, 3-methyltetrahydrofuran); diethers (e.g. ethylene glycol dimethyl ether, ethylene glycol diethyl ether, diethylene glycol dimethyl ether, diethylene glycol diethyl ether) and the like;

Amides:

Formamides (e.g. N-methylformamide, N,N-dimethylformamide, N-ethylformamide, N,N-diethylformamide); acetamides (e.g. N-methylacetamide, N,N-dimethylacetamide, N-ethylacetamide, N,N-diethylacetamide); propionamides (e.g. N,N-dimethylpropionamide); hexamethylphosphoramide and the like;

Oxazolidinones:

N-Methyl-2-oxazolidinone, 3,5-dimethyl-2-oxazolidinone and the like;

Lactones:

γ-Butyrolactone, α-acetyl-γ-butyrolactone, β-butyrolactone, γ-valerolactone, δ-valerolactone and the like;

Nitriles:

Acetonitrile, acrylonitrile and the like;

Carbonates:

Ethylene carbonate, propylene carbonate and the like;

Other organic solvents:

Dimethyl sulfoxide, sulfolane, 1,3-dimethyl-2-imidazolidinone, N-methylpyrrolidone, aromatic solvents (e.g. toluene, xylene), paraffinic solvents (e.g. normalparaffins, isoparaffins) and the like.

In the case of aluminum electrolytic capacitors, solvents based on γ-butyrolactone and/or ethylene glycol are preferred as the solvent. In the case of electric double layer capacitors, solvents based on propylene carbonate and/or γ-butyrolactone are preferred among the solvents mentioned above.

When water is used in combination with an organic solvent, the proportion of water is preferably not more than 5% by weight, more preferably not more than 3% by weight, most preferably not more than 1% by weight, based on the weight of the electrolyte.

The electrolyte of the present invention may contain various additives if necessary. As the additives, there may be mentioned phosphoric acid derivatives, boric acid derivatives and nitro derivatives.

The content of the quaternary salt (A) in the electrolyte of the present invention is generally 1 to 70% by weight, preferably 5 to 40% by weight, based on the weight of the electrolyte.

The electronic component of the present invention is one in which the electrolyte of the present invention is used. As species of the electronic component, there may be mentioned aluminum electrolytic capacitors, electric double layer capacitors and electrochromic display elements, among others.

Particularly preferred among these electronic component species are aluminum electrolytic capacitors, containing therein an electrolyte comprising an organic solvent solution of a salt composed of a cation having a structure resulting from bonding of a $C_1$–$C_{11}$ alkyl or arylalkyl group, which may optionally contain a hydroxyl group, to one of the nitrogen atoms of a cyclic amidine compound of general formula (2) and a carboxylic acid anion.

FIG. 1 shows the constitution of the component part of an aluminum electrolytic capacitor. As shown in FIG. 1, the component is constituted by an aluminum anode foil 1 to serve as the positive electrode and an aluminum cathode foil 2 to serve as the negative electrode as opposed to each other with a separator 3 interposed therebetween and rolled up together. A drawn lead 4 is connected to each of the anode foil 1 and cathode foil 2. The component having such constitution is impregnated with the electrolyte and then placed in an aluminum case, and the case is sealed with a sealing member and by curling, whereupon an aluminum electrolytic capacitor is provided.

EXAMPLES

In the following, a number of concrete embodiments of the present invention are given. They are, however, by no means limitative of the scope of the present invention. The following abbreviations indicate the respective compounds specified below.

MA.MZ-M: maleic acid mono(methyl-quaternized 1-methylimidazole) salt
PA.MZ-M: phthalic acid mono(methyl-quaternized 1-methylimidazole) salt
PA.DMZ-M: phthalic acid mono(methyl-quaternized 1,2-dimethylimidazole) salt
PA.DMEZ-M: phthalic acid mono(methyl-quaternized 1,4-dimethyl-2-ethylimidazole) salt
PA.MBZ-M: phthalic acid mono(methyl-quaternized 1-methyl-benzimidazole) salt
PA.DMZL-M: phthalic acid mono(methyl-quaternized 1,2-dimethylimidazoline) salt
PA.TMZL-M: phthalic acid mono(methyl-quaternized 1,2,4-trimethylimidazoline) salt
PA.MC7ZL-M: phthalic acid mono(methyl-quaternized 1-methyl-2-heptylimidazoline) salt
PA.DMTHP-M: phthalic acid mono(methyl-quaternized 1,2-dimethyl-1,4,5,6-tetrahydropyrimidine) salt
PA.DBU-M: phthalic acid mono(methyl-quaternized 1,8-diazabicyclo[5.4.0]undecene-7) salt
PA.DBN-M: phthalic acid mono(methyl-quaternized 1,5-diazabicyclo[4.3.0]nonene-5) salt
BF$_4$.TMZL-M: tetrafluoroboric acid (methyl-quaternized 1,2,4-trimethylimidazoline) salt
FMS.TMZL-M: trifluoromethanesulfonic acid (methylquaternized 1,2,4-trimethylimidazoline) salt
PF$_6$.DMZL-M: hexafluorophosphoric acid (methyl-quaternized 1,2-dimethylimidazoline) salt
MA.MTEAH: maleic acid mono(methyltriethylammonium) salt
PA.EAH: phthalic acid mono(tetraethylammonium) salt
BF$_4$.EAH: tetrafluoroboric acid mono(tetraethylammonium) salt
GBL: γ-butyrolactone
PC: propylene carbonate.

Production Example 1

A one-liter stirring-type SUS autoclave was charged with 270.0 g of dimethyl carbonate and 82.0 g of 1-methylimidazole and the reaction was carried out at a reaction temperature of 130° C. for 24 hours. The autoclave was then cooled and the reaction mixture was analyzed by liquid chromatography. The conversion of 1-methylimidazole was 95.0%. The unreacted material and solvent were distilled off to give 155.2 g (90% of the theoretical yield) of methylcarbonic acid (methyl-quaternized 1-methylimidazole) salt. Then, 35.0 g of methylcarbonic acid (methyl-quaternized 1-methylimidazole) salt was dissolved in 200 g of methanol, and 24.4 g of maleic acid was added, whereupon carbon dioxide gas evolved violently. Degassing and methanol removal at 80° C./20 mmHg gave 39.2 g (90.2% of the theoretical yield) of maleic acid mono(methylquaternized 1-methylimidazole) salt [MA.MZ-M].

Production Examples 2 to 11

Compounds of Examples 2 to 11 with the respective salt compositions specified below in Table 1 were prepared in the same manner as in Production Example 1 except that the corresponding amidine compounds and acid compounds were used in lieu of 1-methylimidazole and maleic acid, respectively. Examples 1 to 11 and Prior Art Examples 1 and 2

For soldering heat stability evaluation, the salt compositions of Examples 1 to 11 according to the present invention and Prior Art Examples 1 and 2 were subjected to thermogravimetry and differential thermal analysis using a thermal analyzer. The weight loss start temperature and endothermic decomposition peak temperature data thus obtained are shown in Table 1.

Weight loss start temperature: the temperature corresponding to the point of intersection of the rising part of the weight loss curve and the base line extrapolating line.

Thermal analyzer: Thermoflex TG8110, supplied from Rigaku Denki Kabushiki Kaisha Measurement conditions: programming rate 10° C./min., final temperature 350° C., nitrogen atmosphere

TABLE 1

| | | Thermal characteristics (°C.) | |
|---|---|---|---|
| | Salt composition | Weight loss start temperature | Endothermic decomposition temperature |
| Example 1 | MA.MZ—M | 261 | 275 |
| Example 2 | PA.MZ—M | 264 | 281 |
| Example 3 | PA.DMZ—M | 282 | 301 |
| Example 4 | PA.DMEZ—M | 279 | 296 |
| Example 5 | PA.MBZ—M | 266 | 286 |
| Example 6 | PA.DMZL—M | 262 | 287 |
| Example 7 | PA.TMZL—M | 272 | 303 |
| Example 8 | PA.MC7ZL—M | 275 | 299 |
| Example 9 | PA.DMTHP—M | 265 | 290 |
| Example 10 | PA.DBU—M | 294 | 306 |

TABLE 1-continued

| | Salt composition | Thermal characteristics (°C.) | |
|---|---|---|---|
| | | Weight loss start temperature | Endothermic decomposition temperature |
| Example 11 | PA.DBN—M | 271 | 297 |
| Prior Art Example 1 | MA.MTEAH | 241 | 245 |
| Prior Art Example 2 | PA.EAH | 244 | 260 |

The data shown in Table 1 indicate that, in Examples 1 to 11 according to the invention, the weight loss start temperature and endothermic decomposition peak temperature are higher than in Prior Art Examples 1 and 2 and are above the soldering heat stability evaluation temperature (260° C.), hence the quaternary salts of the present invention can withstand reflow soldering.

Examples 12 to 24 and Prior Art Examples 3 to 5

Electrolytes (Examples 12 to 24 according to the present invention and Prior Art Examples 3 to 5) having the respective compositions specified below in Table 2 were prepared and tested for pH and for specific conductivity (30° C., mS/cm) before and after heat treatment (150° C., 10 hours). The results obtained are shown in Table 2, being omitted for the specific conductivity data after heat treatment of Examples 22 to 24 and Prior Art Example 5.

TABLE 2

| | Salt composition | | pH of electrolyte without dilution 25° C. | Specific conductivity (30° C., mS/cm) | |
|---|---|---|---|---|---|
| | | (% by weight) | | initial stage | After heat treatment |
| Example 12 | MA.MZ—M | 25 | 7.2 | 16.5 | 15.3 |
| | GBL | 75 | | | |
| Example 13 | PA.MZ—M | 25 | 7.5 | 12.1 | 11.6 |
| | GBL | 75 | | | |
| Example 14 | PA.DMZ—M | 25 | 7.3 | 11.8 | 11.3 |
| | GBL | 75 | | | |
| Example 15 | PA.DMEZ—M | 25 | 6.5 | 11.5 | 11.5 |
| | GBL | 75 | | | |
| Example 16 | PA.MBZ—M | 25 | 7.3 | 11.0 | 10.6 |
| | GBL | 75 | | | |
| Example 17 | PA.DMZL—M | 25 | 7.5 | 13.2 | 12.8 |
| | GBL | 75 | | | |
| Example 18 | PA.TMZL—M | 25 | 7.0 | 13.0 | 13.0 |
| | GBL | 75 | | | |
| Example 19 | PA.DMTHP—M | 25 | 8.0 | 13.0 | 12.6 |
| | GBL | 75 | | | |
| Example 20 | PA.DBU—M | 25 | 7.5 | 11.2 | 10.5 |
| | GBL | 75 | | | |
| Example 21 | PA.DBN—M | 25 | 8.0 | 11.5 | 10.8 |
| | GBL | 75 | | | |
| Example 22 | $BF_4$.TMZL—M | 25 | 7.1 | 10.9 | — |
| | PC | 75 | | | |
| Example 23 | FMS.TMZL—M | 25 | 7.0 | 10.5 | — |
| | PC | 75 | | | |
| Example 24 | $PF_6$.DMZL—M | 25 | 7.1 | 10.7 | — |
| | PC | 75 | | | |
| Prior Art Example 3 | MA.MTEAH | 25 | 8.0 | 15.7 | 14.7 |
| | GBL | 75 | | | |
| Prior Art Example 4 | PA.EAH | 25 | 7.0 | 10.8 | 10.3 |
| | GBL | 75 | | | |
| Prior Art Example 5 | $BF_4$.EAH | 25 | 6.9 | 10.2 | — |
| | PC | 75 | | | |

As is evident from Table 2, comparison between Example 12 according to the present invention and Prior Art Example 3 and between Examples 13 to 21 and Prior Art Example 4 indicates that the electrolytes comprising the quaternary salts of the present invention as the respective solutes are higher in specific conductivity before and after heat treatment, hence are superior in durability as well.

Comparison between Examples 22 to 24 and Prior Example 5 indicates that the electrolytes of the present invention are higher in specific conductivity.

Examples 25 to 34 and Prior Art Example 6 and 7

Aluminum electrolytic capacitors having the component-constituting part shown in FIG. 1 were produced using a number of electrolytes of the present invention and evaluated for their performance characteristics and reliability. Thus, in Example 25, an aluminum electrolytic capacitor component (rated voltage 6.3 V; capacitance 3.300 μF ; size$\phi$ 18×L15) was prepared by impregnating a rolled-up type aluminum electrolytic capacitor component composed of an anode foil, a cathode foil and a manila fiber separator disposed therebetween, with the electrolyte of the present invention shown in Example 12.

This capacitor component was enclosed in an aluminum-made sheathing case and the opening was closed by curling together with a sealing member. The sealing member used was made of a butyl rubber comprising an isobutylene-isoprene-divinylbenzene copolymer.

In Examples 26 to 34 and Prior Art Examples 6 and 7, the same procedure as in Example 25 was followed using the same rolled-up type aluminum electrolytic capacitor component except that the electrolytes mentioned below were respectively used.

(Electrolyte used)

Example 26: The electrolyte of the present invention shown in Example 13

Example 27: That shown in Example 14

Example 28: That shown in Example 15

Example 29: That shown in Example 16

Example 30: That shown in Example 17

Example 31: That shown in Example 18

Example 32: That shown in Example 19

Example 33: That shown in Example 20

Example 34: That shown in Example 21

Prior Art Example 6: The prior art electrolyte shown in Prior Art Example 3

Prior Art Example 7: The prior art electrolyte shown in Prior Art Example 4

A high-temperature loading test was performed at 110° C. for 2,000 hours by applying the rated voltage to the aluminum electrolytic capacitors of Examples 26 to 34 and Prior Art Example 6. The test results are shown in Table 3. For each test run, 10 capacitors were used and the test result was shown in terms of the average value thereof. The measurements were carried out at 20° C. and the frequency of 120 Hz.

TABLE 3

| | Initial | | After 110° C.-2,000 hrs | |
|---|---|---|---|---|
| | Capacitance (μF) | tan δ (%) | Capacitance (μF) | tan δ (%) |
| Example 26 | 3313 | 15.0 | 3097 | 16.2 |
| Example 27 | 3341 | 15.2 | 3123 | 16.4 |
| Example 28 | 3280 | 15.4 | 3067 | 15.2 |
| Example 29 | 3310 | 15.8 | 3095 | 17.0 |
| Example 30 | 3298 | 14.4 | 3083 | 15.5 |

TABLE 3-continued

|  | Initial | | After 110° C.-2,000 hrs | |
|---|---|---|---|---|
|  | Capacitance (μF) | tan δ (%) | Capacitance (μF) | tan δ (%) |
| Example 31 | 3285 | 14.6 | 3071 | 14.0 |
| Example 32 | 3300 | 14.6 | 3086 | 15.7 |
| Example 33 | 3305 | 15.5 | 3090 | 16.7 |
| Example 34 | 3301 | 15.4 | 3086 | 16.6 |
| Prior Art Example 6 | 3297 | 16.9 | 3083 | 18.2 |

Note:
Number of samples tested = 10.

As is evident from Table 3, the aluminum electrolytic capacitors of Examples 26 to 34 of the present invention are lower in tanδ and are superior also in thermal stability as compared with the aluminum electrolytic capacitor of Prior Art Example 6. Thus, the use of the electrolytes of the present invention has successfully led to an invention of aluminum electrolytic capacitors which is low in tan δ excellent in long-term thermal stability thereof and high in reliability.

Then, sealing stability evaluation was made by applying a reverse voltage of −1.5 V to the aluminum electrolytic capacitors of Examples 25 to 34 and Prior Art Examples 6 and 7 under constant-temperature constant-humidity conditions of 85° C. and 80% relative humidity for 2,000 hours. During the test, the root portion of the anode lead (the negative potential side lead because of the reverse voltage applied) of each capacitor was observed for change in appearance and the extent of change was used as a measure of sealing stability. The results are shown in Table 4. For each test run, 20 capacitors were used.

TABLE 4

| | Sealing stability evaluation (85° C.-80% RH; −1.5 V applied) | | | |
|---|---|---|---|---|
| | After 250 hours | After 500 hours | After 1000 hours | After 2000 hours |
| Example 25 | None showed any abnormality over 2000 hours | | | |
| Example 26 | " | | | |
| Example 27 | " | | | |
| Example 28 | " | | | |
| Example 29 | " | | | |
| Example 30 | " | | | |
| Example 31 | " | | | |
| Example 32 | " | | | |
| Example 33 | " | | | |
| Example 34 | " | | | |
| Prior Art Example 6 | None showed any abnormality | 2 showed liquid oozing | 6 showed liquid oozing | 7 showed liquid oozing |
| Prior Art Example 7 | None showed any abnormality | None showed any abnormality | 2 showed liquid oozing | 5 showed liquid oozing |

Note:
Number of samples tested = 20.

As is evident from Table 4, the aluminum electrolytic capacitors of Examples 25 to 34 of the present invention are effective in inhibiting that deterioration in sealing stability which readily occurs when a reverse voltage is applied to capacitors or when a voltage is applied thereto under high-humidity conditions, as compared with the aluminum electrolytic capacitors of Prior Art Examples 6 and 7. Thus, the combined use of the electrolytes of the present invention and the butyl rubber polymer sealing member has successfully led to an invention of highly reliable aluminum electrolytic capacitors having good sealing stability.

Furthermore, when rolled-up type electric double layer capacitors were constructed by impregnation with the electrolytes of Examples 22 to 24 and Prior Art Example 5, the electric double layer capacitors in which the electrolytes of Examples 22 to 24 were better in sealing stability as compared with the electric double layer capacitors in which the electrolyte of Prior Art Example 5 was used.

INDUSTRIAL UTILITY

As illustrated hereinabove, the quaternary salt of the present invention shows good thermal characteristics and high thermal stability and the electrolyte comprising said quaternary salt as a solute is high in specific conductivity and excellent in durability and, in addition, never deteriorates or corrodesresins, rubbers or metals.

When used in electronic components, for example aluminum electrolytic capacitors, the electrolyte of the present invention can realize capacitors low in tanδ long in life with stable high-temperature electric characteristics (change in tansδ), and high in reliability and at the same time can realize highly reliable aluminum electrolytic capacitors free of that deterioration of sealing stability which readily occurs when a reverse voltage is applied thereto or when a voltage is applied thereto under high-humidity conditions.

When used in chip-form aluminum electrolytic capacitors, the electrolyte of the present invention can realize chip-form aluminum electrolytic capacitors having good soldering heat resistance and showing high packaging reliability.

When used in electric double layer capacitors, the electrolyte of the present invention, as in the case of aluminum electrolytic capacitors, can realize highly reliable electric double layer capacitors free of that deterioration in sealing stability which readily occurs when a reverse voltage is applied thereto or when a voltage is applied thereto under high-humidity conditions.

Further, when used in electrochromic display devices, the electrolyte produces favorable effects in that it does not corrode those parts of the electrochromic display devices which are in contact with the electrolyte and that it has a high specific conductivity and prolongs the life of the electrochromic display devices.

The present invention is thus of high industrial value.

We claim:

1. An electrolyte which comprises a solution of a quaternary salt (A) of a compound (a) having an N,N,N'-substituted amidine group, wherein said quaternary salt (A) being composed of a cation obtainable by quaternizing said compound (a) by means of a quaternizing agent and a member selected from the group consisting of an organic acid anion and an inorganic acid anion, and said compound (a) having the general formula (1) shown below:

$$R^1-C=NR^4 \quad (1)$$
$$R^2-N-R^3$$

wherein $R^1$ is a member selected from the group consisting of a $C_1-C_{20}$ hydrocarbon group, which may optionally be substituted by a hydroxyl group, and a hydrogen atom; and $R^2$, $R^3$ and $R^4$ each independently is a $C_1-C_{10}$ hydrocarbon group, which may optionally have a member selected from the group consisting of hydroxyl, amino, nitro, cyano, carboxyl, ether and aldehyde group; or the general formula (2) shown below:

$$R^5—C=N \atop R^6—N—Q \qquad (2)$$

wherein $R^5$ is a $C_1$–$C_{20}$ hydrocarbon group, which may optionally be substituted by a hydroxyl group; $R^6$ is a $C_1$–$C_{10}$ hydrocarbon group, which may optionally be substituted by a hydroxyl group; and Q is a member selected from the group consisting of $C_2$–$C_{10}$ alkylene, arylene and alkenylene group, which may optionally be substituted by a member selected from the group consisting of $C_1$–$C_5$ hydrocarbon, amino, nitro, cyano, carboxyl, aldethyde and ether group.

2. An electrolyte as claimed in claim 1, wherein the compound (a) is a compound having 2-imidazoline ring.

3. An electrolyte as claimed in claim 2, wherein the compound having 2-imidazoline ring is at least one member selected from the group consisting of 1,2-dimethylimidazoline, 1,2,4-trimethylimidazoline, 1,4-dimethyl-2-ethylimidazoline, 1-methyl-2-phenylimidazoline, 1-methyl-2-benzyllmidazoline, 1-methyl-2-oxyethylimidazoline, 1-methyl-2-heptylimidazoline, 1-methyl-2-undecylimidazoline, 1-methyl-2-heptadecylimidazoline, 1-(β-oxyethyl)-2-methylimidazoline, 1-methyl-2-ethoxymethylimidazoline and 1-ethoxymethyl-2-methylimidazoline.

4. An aluminum electrolytic capacitor in which use is made of an electrolyte solution comprising a quaternary salt composed of (1) a cation having a structure resulting from a $C_1$–$C_{11}$ alkyl or arylalkyl group, which may optionally contain a hydroxyl group, which is attached to one of the two nitrogen atoms of the compound (a) of the electrolyte of claim 2 and (2) a carboxylic acid anion in an organic solvent.

5. An electrolyte as claimed in claim 1, wherein the compound (a) is a compound having an imidazole ring.

6. An electrolyte as claimed in claim 5, wherein the compound having an imidazole ring is at least one member selected from the group consisting of 1,2-dimethylimidazole, 1-ethyl-2-methylimidazole, 1-phenyl-2-methylimidazole, 1-benzyl-2-methylimidazole, 1-methyl-2-phenylimidazole, 1-methyl-2-benzylimidazole, 1,2,4-trimethylimidazole, 1,4-dimethyl-2-ethylimidazole, 1-methyl-2-oxymethylimidazole, 1-methyl-2-oxyethylimidazole, 1,2-dimethyl-4(5)-nitroimidazole, 1,2-dimethyl-5(4)-aminoimidazole and 1-methyl-2-benzylbenzimidazole.

7. An aluminum electrolytic capacitor in which use is made of an electrolyte solution comprising a quaternary salt composed of (1) a cation having a structure resulting from a $C_1$–$C_{11}$ alkyl or arylalkyl group, which may optionally contain a hydroxyl group, which is attached to one of the two nitrogen atoms of the compound (a) of the electrolyte of claim 5 and (2) a carboxylic acid anion in an organic solvent.

8. An electrolyte as claimed in claim 1, wherein the compound (a) is a compound having tetrahydropyrimidine ring.

9. An electrolyte as claimed in claim 8, wherein the compound having a tetrahydropyrimidine ring is 1,2-dimethyl-1,4,5,6-tetrahydropyrimidine.

10. An aluminum electrolytic capacitor in which use is made of an electrolyte solution comprising a quaternary salt composed of (1) a cation having a structure resulting from a $C_1$–$C_{11}$ alkyl or arylalkyl group, which may optionally contain a hydroxyl group, which is attached to one of the two nitrogen atoms of the compound (a) of the electrolyte of claim 8 and (2) a carboxylic acid anion in an organic solvent.

11. An electrolyte as claimed in claim 1, wherein the quaternary salt (A) is composed of a cation having a structure resulting frum a $C_1$–$C_{11}$ alkyl or arylalkyl group, which may optionally contain a hydroxyl group, attaching to one of the two nitrogen atoms of the compound (a) and an organic acid anion or inorganic acid anion.

12. An electrolyte as claimed in claim 11, wherein the anion constituting the quaternary salt (A) is an anion of an organic acid selected from the group consisting of carboxylic acids, phosphoric acids, monoalkyl phosphates and dialkyl phosphates.

13. An electrolyte as claimed in claim 12, wherein the organic acid is a member selected from the group consisting of phthalic acid, maleic acid and mixtures thereof.

14. An electrolyte as claimed in claim 1, wherein said on is a solution of said quaternary salt (A) in a member selected from the group consisting of γ-butyrolactone, ethylene glycol and mixtures thereof.

15. An electronic component comprising the electrolyte of claim 1.

16. An electronic component in which use is made of an electrolyte which comprises a solution of a quaternary salt (A) of a compound (a) having an N,N,N'-substituted amidine group, wherein said quaternary salt (A) being composed of a cation obtainable by quaternizing said compound (a) by means of a quaternizing agent and a member selected from the group consisting of an organic acid anion and an inorganic acid anion, and said compound (a) having the general formula (1) shown below:

$$R^1—C=NR^4 \atop R^2—N—R^3 \qquad (1)$$

wherein $R^1$ is a member selected from the group consisting of a $C_1$–$C_{20}$ hydrocarbon group, which may optionally be substituted by hydroxyl group, and a hydrogen atom; and $R^2$, $R^3$ and $R^4$ each independently is a $C_1$–$C_{10}$ hydrocarbon group, which may optionally have a member selected from the group consisting of hydroxyl, amino, nitro, cyano, carboxyl, ether and aldehyde group, and two to all of $R^1$, $R^2$, $R^3$ and $R^4$ are optionally mutually united to form at least one ring.

17. An aluminum electrolytic capacitor containing an electrolyte solution comprising a quaternary salt composed of a cation having a structure resulting from a member selectd from the group consisting of a $C_1$–$C_{22}$ alkyl and arylalkyl group, which optionally contains a hydroxyl group, attaching to one of the two nitrogen atoms of a cyclic amidine compound of the general formula (2) shown below:

$$R^5—C=N \atop R^6—N—Q \qquad (2)$$

wherein $R^5$ is a member selected from the group consisting of a $C_1$–$C_{20}$ hydrocarbon group, which may optionally be substituted by a hydroxyl group, and a hydrogen atom; $R^6$ is a $C_1$–$C_{10}$ hydrocarbon group, which may optionally be substituted by a hydroxyl group; and Q is a member selected from the group consisting of a $C_2$–$C_{10}$ alkylene, arylene and alkenylene group, which may optionally be substituted by a member selected from the group consisting of a $C_1$–$C_5$ hydrocarbon group, an amino, nitro, cyano, carboxyl, ether and aldehyde group, and a carboxylic acid anion in an organic solvent.

* * * * *

UNITED STATES PATENT AND TRADEMARK OFFICE
CERTIFICATE OF CORRECTION

PATENT NO.   : 5,870,275
DATED        : February 9, 1999
INVENTOR(S)  : Shiono et al It is certified that error appears in the above-identified patent and that said Letters Patent is hereby corrected as shown below:

Claim 3, line 6, change "1-methyl-2-benzyllmidazoline" to ---1-methyl-2-benzylimidazoline---.

Claim 8, line 2, change "having tetrahydropyrimidine" to ---having a tetrahydropyrimidine---.

Claim 14, line 1, change "said on" to ---said solution---.

Signed and Sealed this

Tenth Day of August, 1999

Q. TODD DICKINSON

Attest:

Attesting Officer

Acting Commissioner of Patents and Trademarks